US010549793B2

(12) United States Patent
Huston et al.

(10) Patent No.: US 10,549,793 B2
(45) Date of Patent: Feb. 4, 2020

(54) LATCH MECHANISM

(71) Applicant: Club Car, LLC, Evans, GA (US)

(72) Inventors: Steven Paul Huston, Evans, GA (US);
Dean Jayson Long, Lakewood, FL (US)

(73) Assignee: Club Car, LLC, Evans, GA (US)

( * ) Notice: Subject to any disclaimer, the term of this patent is extended or adjusted under 35 U.S.C. 154(b) by 139 days.

(21) Appl. No.: 14/974,907

(22) Filed: Dec. 18, 2015

(65) Prior Publication Data

US 2016/0185397 A1 Jun. 30, 2016

Related U.S. Application Data

(60) Provisional application No. 62/098,527, filed on Dec. 31, 2014.

(51) Int. Cl.
 *E05B 63/24* (2006.01)
 *B62D 33/037* (2006.01)
 *E05B 85/18* (2014.01)

(52) U.S. Cl.
 CPC .......... *B62D 33/037* (2013.01); *E05B 63/248* (2013.01); *E05B 85/18* (2013.01)

(58) Field of Classification Search
 CPC ........ E05B 85/18; E05B 63/248; E05B 83/16; E05C 3/12; B62D 33/037
 See application file for complete search history.

(56) References Cited

U.S. PATENT DOCUMENTS

| 1,371,547 | A | * | 3/1921 | Burky | E05B 63/248 |
| | | | | | 292/134 |
| 1,453,282 | A | * | 5/1923 | Peters | E05B 63/248 |
| | | | | | 292/126 |
| 1,741,389 | A | * | 12/1929 | Wilson | E05B 63/248 |
| | | | | | 292/254 |
| 2,166,735 | A | * | 7/1939 | Sward | E05B 63/248 |
| | | | | | 292/224 |
| 2,194,601 | A | * | 3/1940 | Kuethe | E05B 63/248 |
| | | | | | 292/224 |
| 2,288,926 | A | * | 7/1942 | Strader | B62D 33/0273 |
| | | | | | 105/458 |

(Continued)

FOREIGN PATENT DOCUMENTS

WO 2007106499 A2 9/2007

*Primary Examiner* — Katherine W Mitchell
*Assistant Examiner* — Abe Massad
(74) *Attorney, Agent, or Firm* — Taft, Stettinius & Hollister LLP

(57) ABSTRACT

A latch mechanism for releasably securing a hinged gate to one or more latches. The latch mechanism includes a handle that is pivotally connected to a gate wall. The handle includes at least one retention arm that lockingly engages a latch when the hinged gate is in a latched position. According to certain embodiments, the handle includes a retention arm at both ends of the handle, with the handle extending generally along the length of the gate wall. Further, the handle may be pivotally displaced about the retention arm(s) so that the handle is displaced from the first position to a second position. As the handle is pivotally displaced to the second position, a release mechanism of the handle may engage and pivotally displace the adjacent latch so that the retention arm may be released from the locking engagement with the latch.

14 Claims, 6 Drawing Sheets

(56) References Cited

U.S. PATENT DOCUMENTS

| | | | | |
|---|---|---|---|---|
| 2,968,506 A * | 1/1961 | Lade | ...................... | E05B 63/248 |
| | | | | 292/21 |
| 4,358,150 A * | 11/1982 | Nash | ................. | B62D 33/0273 |
| | | | | 292/DIG. 29 |
| 5,342,103 A * | 8/1994 | Tame | ...................... | B60N 2/366 |
| | | | | 292/246 |
| 5,707,095 A * | 1/1998 | Pribak | ................. | B62D 33/0273 |
| | | | | 16/82 |
| 5,868,478 A * | 2/1999 | Yemini | ................... | A47B 95/02 |
| | | | | 292/107 |
| 5,947,540 A * | 9/1999 | Pariseau | ............ | B62D 33/0273 |
| | | | | 296/146.6 |
| 6,048,018 A | 4/2000 | Shambeau et al. | | |
| 6,550,838 B2 * | 4/2003 | Bobbitt, III | .......... | B62D 33/037 |
| | | | | 292/175 |
| 7,070,222 B2 | 7/2006 | Bruford et al. | | |
| 7,243,968 B2 | 7/2007 | Kiester et al. | | |
| D606,565 S | 12/2009 | Hickenbottom | | |
| 7,651,141 B2 * | 1/2010 | Kraenzle | ............. | B62D 33/037 |
| | | | | 292/341.15 |
| 8,109,553 B2 | 2/2012 | Zielinsky | | |
| 8,414,083 B2 | 4/2013 | Dunker | | |
| 9,670,704 B2 * | 6/2017 | Huston | ................... | E05B 85/18 |
| 2015/0076853 A1 * | 3/2015 | Skolimowski | .......... | B60R 11/02 |
| | | | | 296/63 |
| 2015/0354254 A1 * | 12/2015 | Huston | ................... | E05B 85/18 |
| | | | | 296/50 |

* cited by examiner

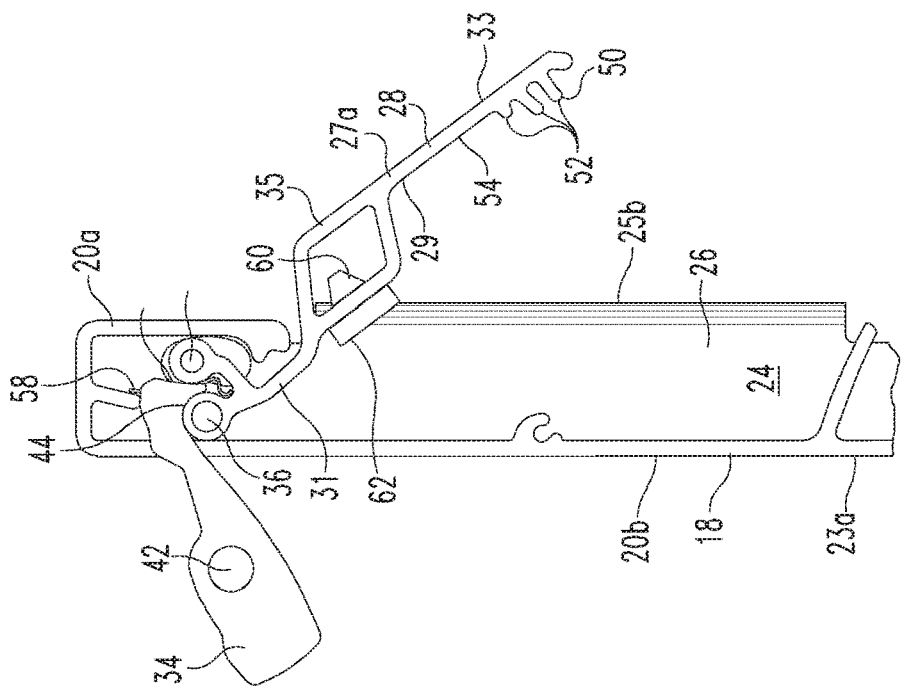
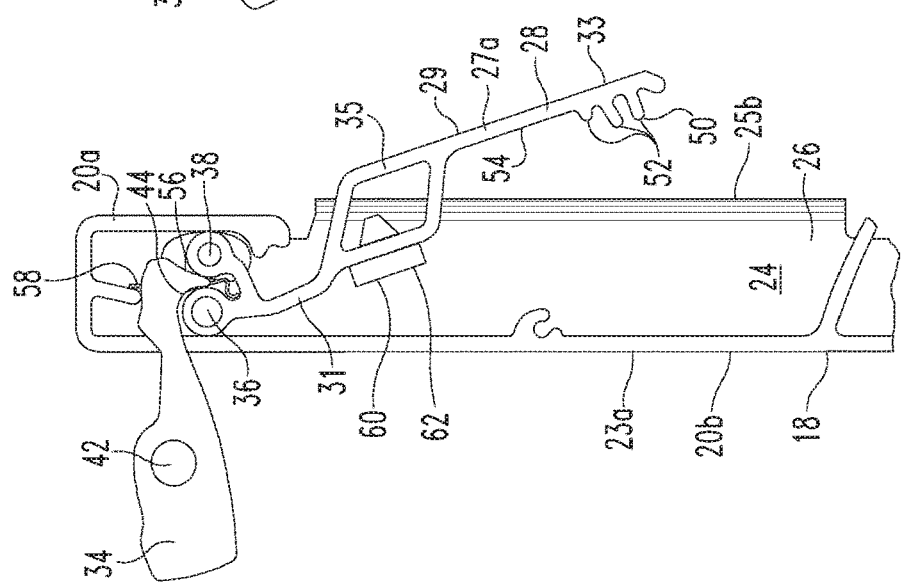
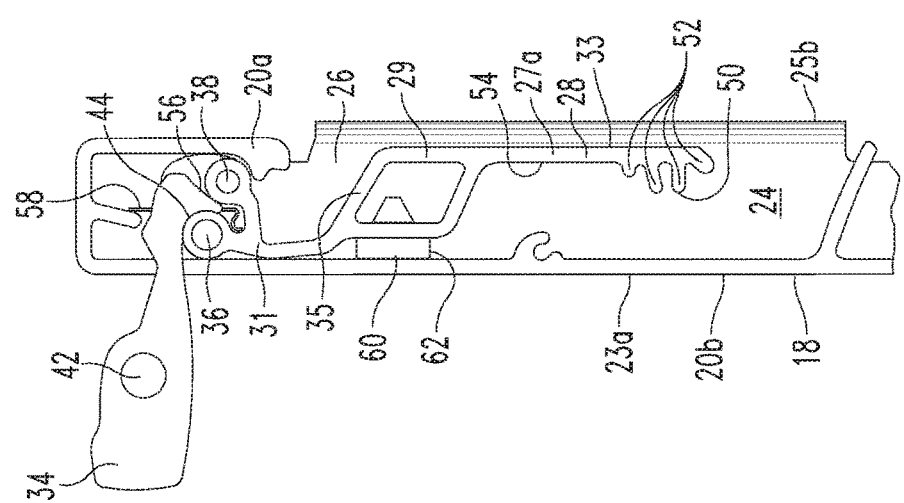

LATCH MECHANISM

CROSS REFERENCE TO RELATED APPLICATIONS

The present application claims the benefit of U.S. Provisional Patent Application Ser. No. 62/098,527, filed Dec. 31, 2014, which is incorporated herein by reference in its entirety.

BACKGROUND

A variety of different types of products and devices utilize a hinged gate to control the ingress and egress of people or items through an entryway. For example, utility vehicles, including trucks, small wheeled carts, and trailers, may utilize a hinged gate, such as, for example, a tailgate, to act as a barrier to control the entry and removal of items from a storage bed of the vehicle. Further, for example, storage devices, containers, and compartments, including, for example, tool boxes, may include a hinged gate, such as, for example, a hinged door or panel, to control access to, or removal of, items contained within the associated storage device.

The positioning and/or orientation of the hinged gate may, at least in part, be controlled through the operation of a latch mechanism. More specifically, latch mechanisms may be configured to secure and/or retain the hinged gate in a closed or latched position, as well as control the releasing of the hinged gate from the latched position. When in the latched position, the hinged gate may be secured in an orientation that prevents or otherwise hinders the entry or removal of items or people past the hinged gate.

For at least certain applications, multiple latch mechanisms may be required to independently secure the hinged gate in, as well as control the release of the hinged gate from, the latched position. For example, tailgates for certain types of vehicles are required to be secured in the latched position by multiple, independently operated, latch mechanisms. In such circumstances, the operation of the latch mechanisms often is controlled using connecting linkages, such as cables and rods, that connect a handle to the latching mechanism. Often, such linkages are positioned in a cavity of the hinged gate that is provided by the addition of a cover to the hinged gate. Yet, the associated connecting linkages and related componentry used to operate such latch mechanisms, as well as the inclusion of a cover for the hinged gate, if needed, may increase the number of components and complexity of both the hinged door and the associated latch mechanism.

BRIEF SUMMARY

An aspect of the present invention is a handle for a latch mechanism for releasably securing a hinged gate to first and second latches. The handle includes a body portion having a first end that includes a first retention arm and a first release mechanism. The first retention arm is configured for a locking engagement with the first latch. The second end has a second retention arm and a second release mechanism. Additionally, the second retention arm is configured for a locking engagement with the second latch. Further, the first and second release mechanisms are adapted to pivotally displace the first and second latches to release the first and second retention arms from the locking engagements with the first and second.

Another aspect of the present invention is a latch mechanism that includes a latch having a tip portion and an engagement portion, the engagement portion generally defining a recess. The latch mechanism also includes a handle having at least one retention arm and at least one release mechanism. The handle is configured for pivotal displacement between a first position and a second position. Additionally, at least a portion of the at least one retention arm is adapted to be received within the recess when the handle is in the first position, and to be removable from the recess at least when the handle is in the second position. Further, the release mechanism is configured to engage the tip portion to pivotally displace the latch as the handle is pivotally displaced toward the second position.

Another aspect of the present invention is a hinged gate that includes a gate wall having a front portion, a rear portion, and a pair of opposing ends. The hinged gate also includes a handle that is pivotally connected to the gate wall for pivotal displacement of the handle between first and second positions. Additionally, according to certain embodiments, the handle has first and second ends that are adjacent to a different end of the pair of opposing ends. The handle may further include a first retention arm and a first release mechanism that are positioned at the first end of the handle, and a second retention arm and a second release mechanism that are positioned at the second end of the handle. The hinged gate may also include a first latch positioned adjacent to the first end that has a first engagement portion that generally defines a first recess. The first recess may be configured to receive the insertion of at least a portion of the first retention arm for a locking engagement between the first latch. Further, the hinged gate may also include a second latch that is positioned adjacent to the second end of the handle. The second latch has a second engagement portion that generally defines a second recess. The second recess is configured to receive the insertion of at least a portion of the second retention arm for a locking engagement between the second latch and the second retention arm.

Other aspects of the present invention will become apparent by consideration of the detailed description and accompanying drawings.

BRIEF DESCRIPTION OF THE DRAWINGS

FIG. 9 illustrates a cross sectional view of the latch mechanism shown in FIG. 5 with the handle in a first position and the latch in a locking engagement with a retention arm so that the hinged gate is in the latched position, according to an illustrated embodiment of the present invention.

FIGS. 10 and 11 illustrate side cross sectional views of the latch mechanism shown in FIG. 5 as the handle is displaced to a second position so as to release the retention arm from a locking engagement with the latch, and thereby allow the hinged gate to be released from the latched position, according to an illustrated embodiment of the present invention.

Figure 1:
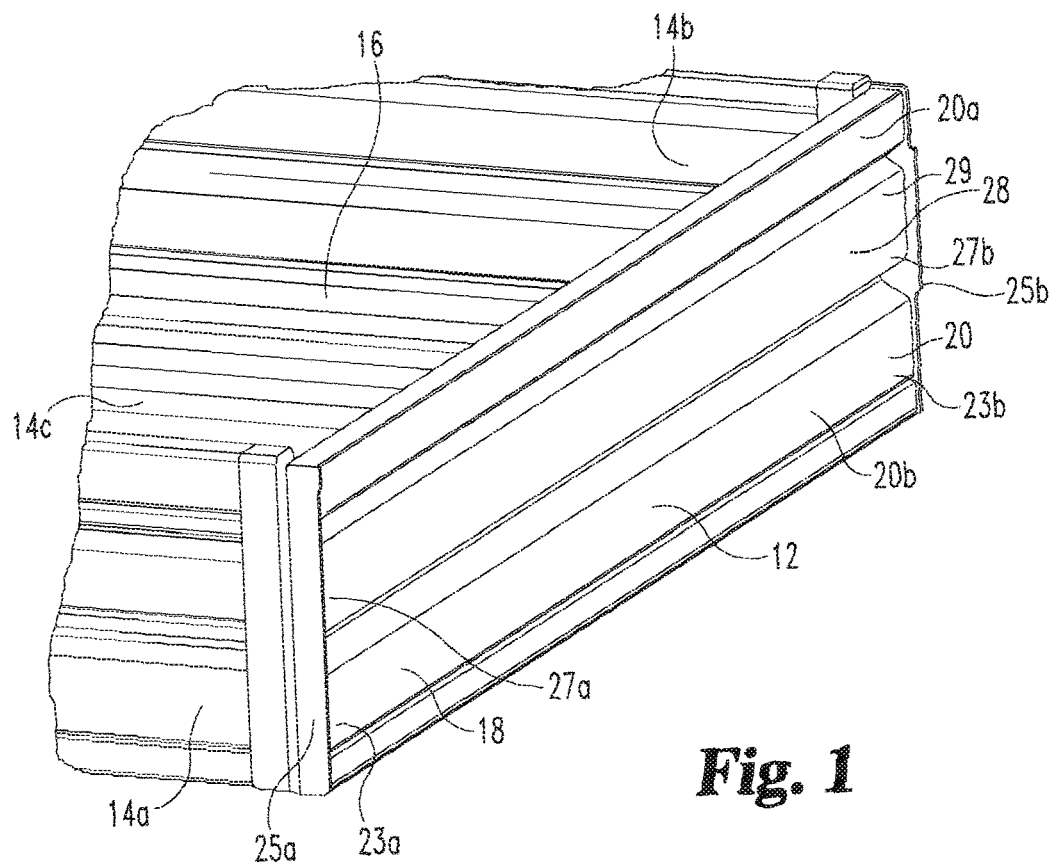
FIG. 1 illustrates a perspective side view of a portion of a housing having a hinged gate that is being retained in a latched position by a latch mechanism according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a perspective side view of a portion of a housing 10 having a hinged gate 12 that is being retained in a latched position by a latch mechanism according to an illustrated embodiment of the present invention. The housing 10 may include a plurality of walls 14a-c that generally define a storage area 16 of the housing 10. For example, in the illustrated embodiment, the housing 10 may be a generally square or rectangular storage bed of a vehicle, such as, for example, a petroleum and/or electrically powered truck or small wheeled vehicle. However, the latching mechanism of the present invention may be utilized with a variety of different types of housings 10 that are associated with a variety of different types of applications or purposes. Further, the housing 10, and thus the storage area 16, may have variety of variety of different shapes, sizes, and configurations.

Figure 3:
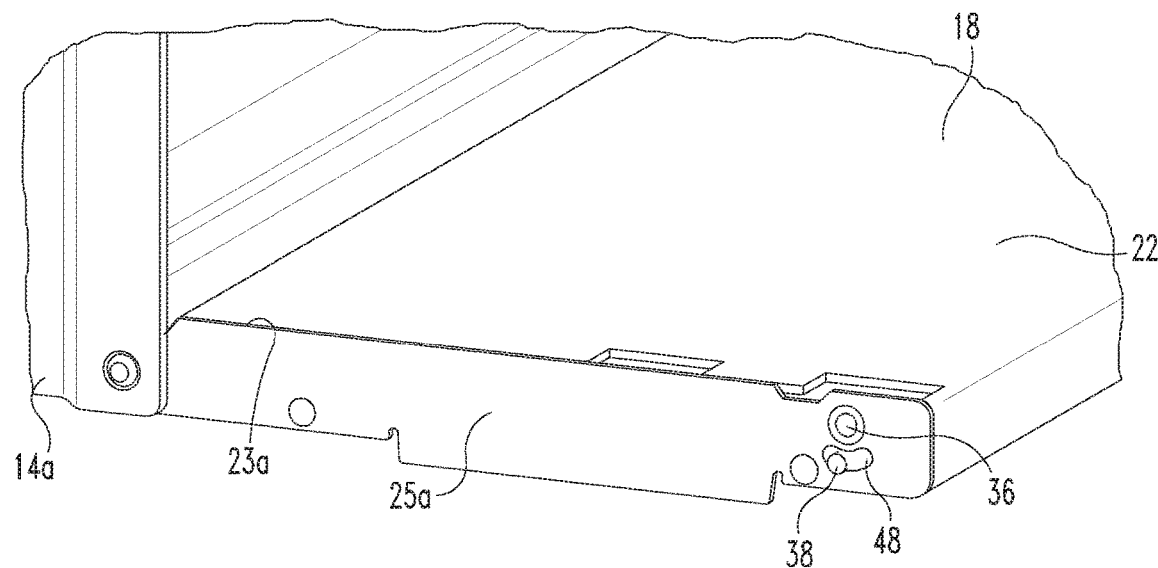
FIG. 3 illustrates a side perspective view of a latch mechanism that is a partially covered by a sidewall of a hinged gate according to an illustrated embodiment of the present invention.
Figure 5:
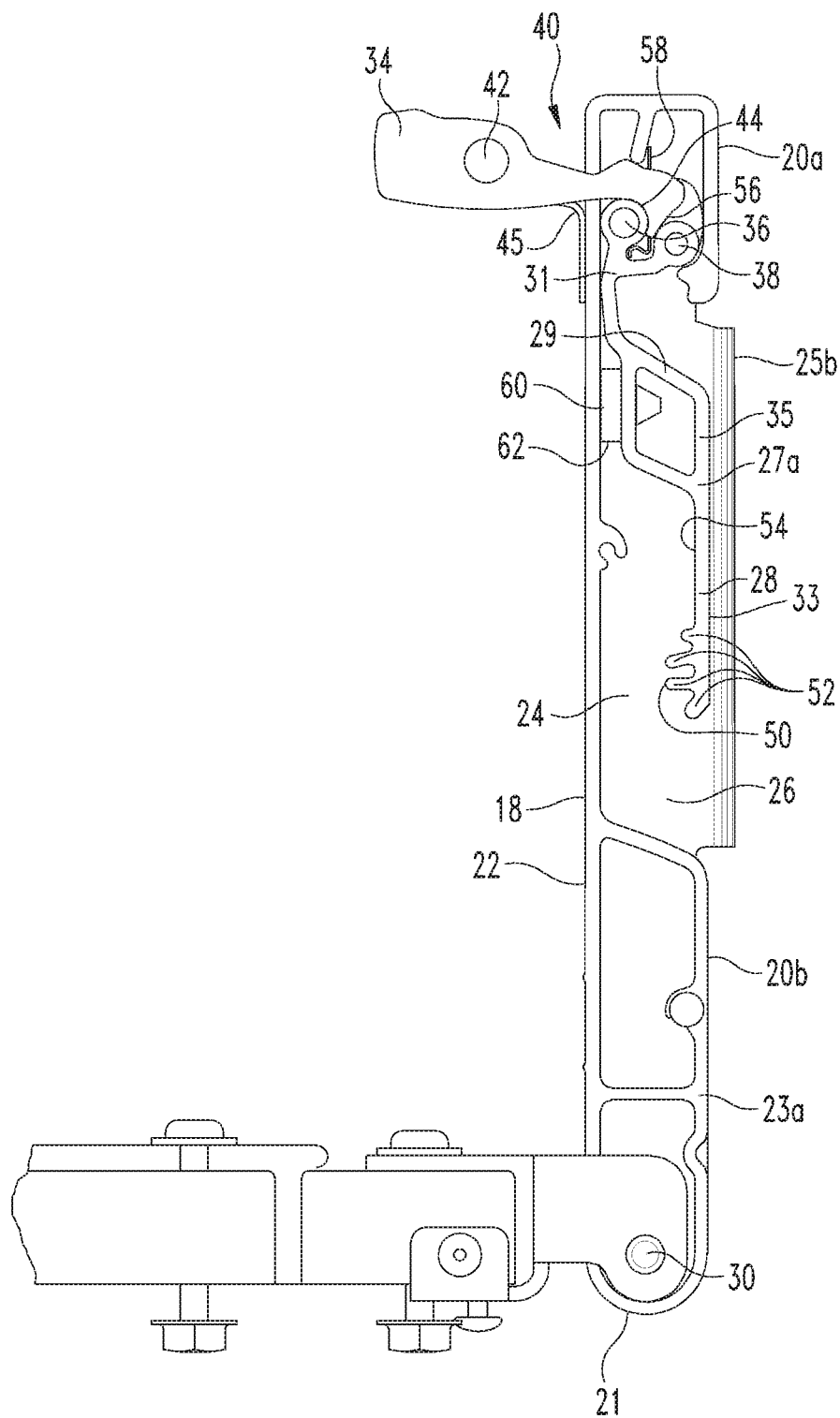
FIG. 5 illustrates a side cross sectional view of a latch mechanism according to an illustrated embodiment of the present invention.

Referencing FIGS. 1, 3, and 5, in the illustrated embodiment, the hinged gate 12 includes a gate wall 18 having a front portion 20 and a rear portion 22 that generally define an inner region 24 of the hinged gate 12. Further, according to the illustrated embodiment, the front portion 20 is separated into two or more front portion segments 20 a, 20 b that are separated from each other by at least one gap 26. As discussed below in more detail, the gap 26 and at least a portion of inner region 24 are configured to receive the pivotal placement of a handle 28 of the latching mechanism.

Figure 4:
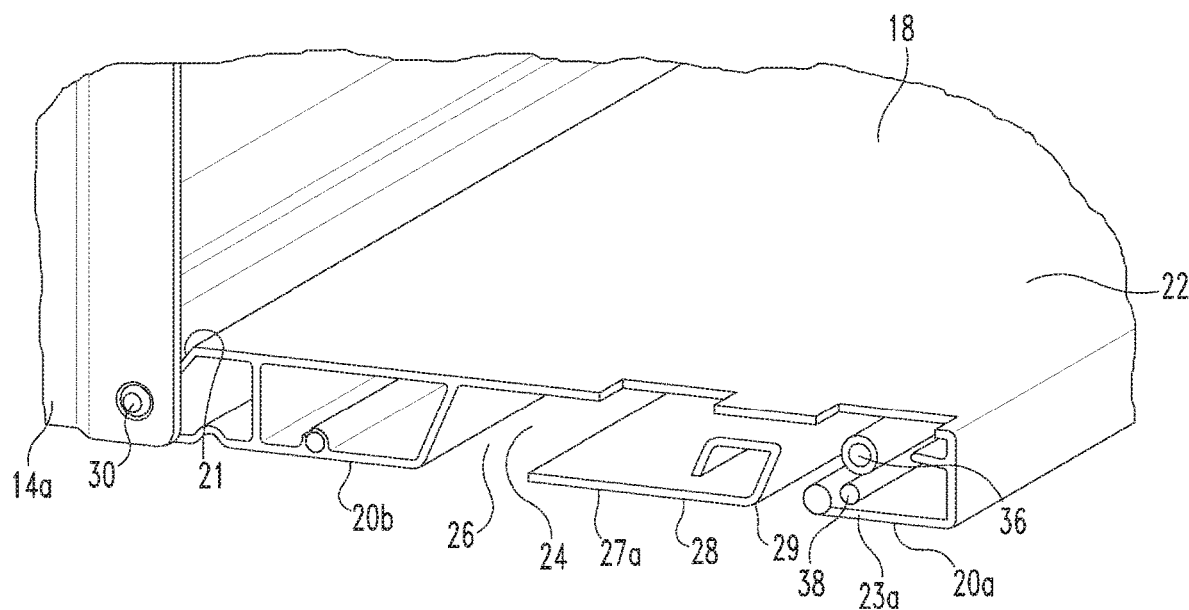
FIG. 4 illustrates the side perspective view of FIG. 3 with the sidewall of the hinged gate removed.

In the illustrated embodiment, a bottom portion of the gate wall 18 is operably connected to the housing 10 such that the hinged gate 12 may be pivoted from a latched position, as shown in FIG. 5, to an unlatched position, as shown, for example, in FIG. 4. For example, in the illustrated embodiment, a bottom portion 21 of the gate wall 18 is pivotally connected to the housing 10, such as, for example, by one or more pins rods 30. However, the hinged gate 12 may be pivotally connected to the housing 10 in a variety of different manners, including, for example by one or more hinges.

Figure 2:
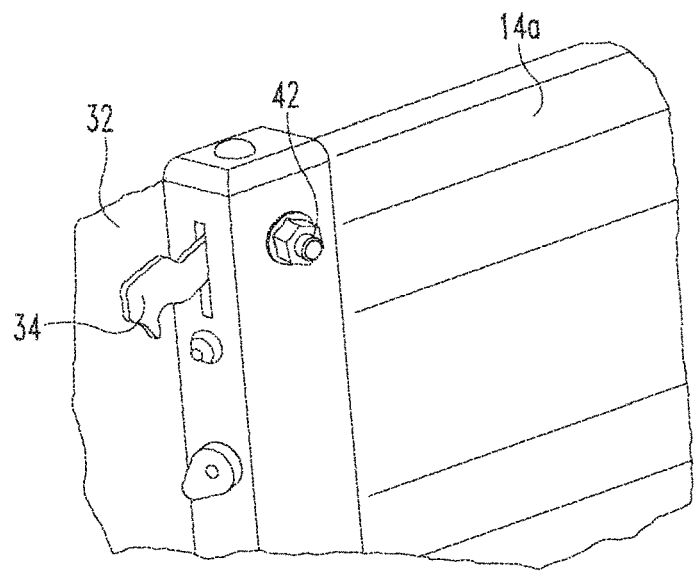
FIG. 2 illustrates a perspective side view of a portion of a latch of a latch mechanism that is pivotally secured to a storage area according to an illustrated embodiment of the present invention.

Referencing FIGS. 1, 3, and 4, according to certain embodiments, opposing ends 23a, 23b of the gate wall 18 may include, or be connected to, side portions or covers 25a, 25b. The sides covers 25a, 25b may cover at least a portion of the respective ends 23a, 23b of the gate wall 18. In the illustrated embodiments, the side covers 25a, 25b may generally extend from at least the rear portion 22 to the front portion 20 of the gate wall 18. Further, referencing FIG. 2, according to certain embodiments, at least a portion of the sidewalls 14a, 14b of the housing 10 may include a recess 32 that is configured to receive the placement of at least a portion of the side covers 25a, 25b when the hinged gate 12 is at least in the latched position.

Referencing FIGS. 5-11, the latch mechanism 40 of the illustrated embodiment may include a handle 28, at least one latch 34, and at least one retention arm 36. According to certain embodiments, the latch(es) 34 may be pivotally connected to a wall(s) 14a, 14b of the housing 10. For example, according to certain embodiments, the latch 34 may include an orifice that is sized to receive the insertion of a pin or rod 42 or other mechanism about which the latch 34 may be pivotally displaced, and which may secure the latch 34 to an adjacent wall 14a, 14b of the housing 10. A variety of different types of pins or rods 42 may be used, including, for example, a bolt, pin, or screw.

The latch 34 may include an engagement portion 44 that generally defines a recess 46 in the latch 34. The recess 46 is configured to receive the placement of at least a portion of the retention arm 36 when the hinged gate 12 is in the latched position. Moreover, when the hinged gate 12 is in the latched position, the engagement portion 44 of the latch 34 may be positioned about at least a portion of the retention arm 36 so as to provide a barrier against the subsequent operable removal of the retention arm 36 from the recess 46, thereby providing a locking engagement between the latch 34 and the hinged gate 12. When the hinged gate 12 is to be released from the latched position, the latch 34 may be pivoted so that the engagement portion 44 is displaced to a position in which the engagement portion 44 no longer provides a barrier against the removal of the retention arm 36 from the recess 46, as discussed below.

The latch 34 may be operably attached to a latch biasing member 45, such as, for example, a spring. The latch biasing member 45 may be configured to provide a force that at least assists in retaining the latch 34 in a locking engagement with the retention arm 36 when the hinged gate 12 is in the latched position. For example, the latch biasing member 45 may provide a biasing force that biases at least a portion of the engagement portion 44 of the latch 34 toward and/or against the retention arm 36 when at least a portion of the retention arm 36 is positioned within the recess 46 so as to at least assist in retaining the locking engagement between the latch 34 and the retention arm 36 when the hinged gate 12 is in the latched position. Inclusion of the latch biasing member 45 may also ensure that a force sufficient to overcome the biasing force of the latch biasing member 45 is applied to pivotally displace the latch 34 before the hinged gate 12 is released from the latched position.

In the illustrated embodiment, the handle 28 includes a body portion 29 having a first portion 31 and a second portion 33 that are separated by a mid-portion 35. In the illustrated embodiment, the first portion 31 and second portion 33 are generally positioned along first and second planes, respectively, that are generally parallel to, and offset from, each other. According to certain embodiments, the second portion 33 of the handle 28 may be configured to extend at least partially into the gap 26 between the front portion segments 20a, 20b of the gate wall 18 so as to at least improve the ease at which a user may access and/or engage the handle 28, as well as prevent the gate wall 18 from interfering with the pivotal displacement of the handle 28.

Further, according to certain embodiments, the second portion 33 may include a grip element 50 that may enhance a user's ability to securely grasp the handle 28. In the illustrated embodiment, the grip element 50 includes one or more protrusions 52 that extend from an inner surface 54 of the handle 28. Additionally, according to the illustrated embodiment, the handle 28 may generally extend between the opposing ends 23a, 23b of the gate wall 18 so that the handle 28 may be utilized to generally simultaneously operate separate latches 34 that are positioned about opposing walls 14a, 14b of the housing 10.

According to certain embodiments, the handle 28 may pivot between a first position (shown for example in FIGS. 1 and 5) and a second position (FIG. 11) about at least a portion of the retention arm 36. According to such embodiments, the retention arm 36 may be an extension of a pin, rod, or other structure that extends into and/or through an orifice in the first portion 31 of the handle 28. Alternatively, the handle 28 may pivot about a separate pin or rod, and the retention arm 36 may be a protrusion that extends from the first portion 31 of the handle, an adjacent end 23a, 23b of the gate wall 18, and/or the cover 25a, 25b. Referencing FIG. 3, in the illustrated embodiment, the cover 25a includes an orifice 48 that is sized to allow passage of the retention arm 36 through the cover 25a so that retention arm 36 may extend to a location at which, when the hinged gate 12 is at or near the latched position, the retention arm 36 may engage the latch 34.

The handle 28 may also include a release mechanism 38 that is configured to at least assist in disengaging the latch 42 from the retention arm 36 (also illustrated is a neck that extends between the release mechanism 38 and the retention arm 36). According to certain embodiments, the release mechanism 38 is a monolithic portion of the handle 28 that is located at one or more ends 27a, 27b of the handle 28. Alternatively, the release mechanism 38 is operably connected to the handle 28, such as, for example, by a mechanical fastener, including a pin, bolt, or screw, among other fasteners. Further, the release mechanism 38 may have a variety of different shapes and sizes, such as, for example, having at least a generally round surface that is configured to engage a tip region 56 of the latch 34.

Figure 8:
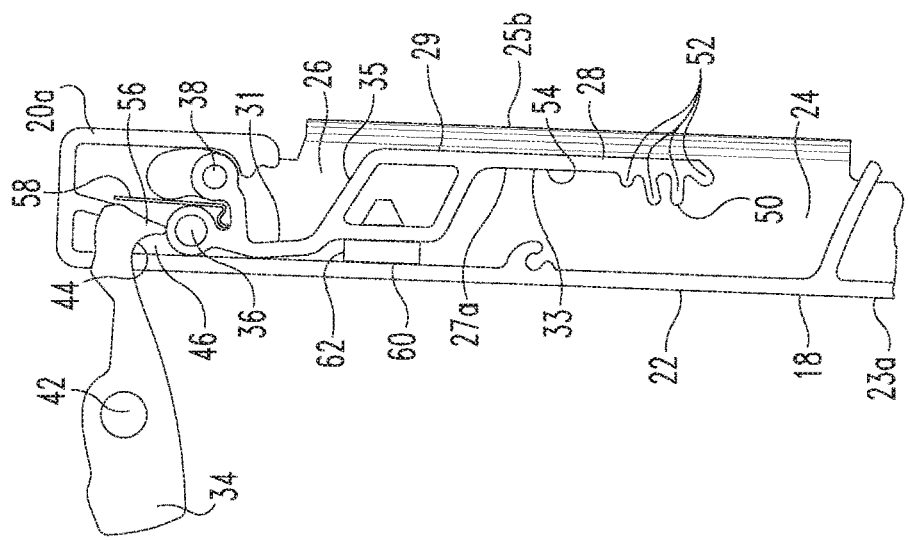
FIGS. 6, 7, and 8 illustrate side cross sectional views of the latch mechanism shown in FIG. 5 as the hinged gate is being displaced towards the latched position, according to an illustrated embodiment of the present invention.
Figure 7:
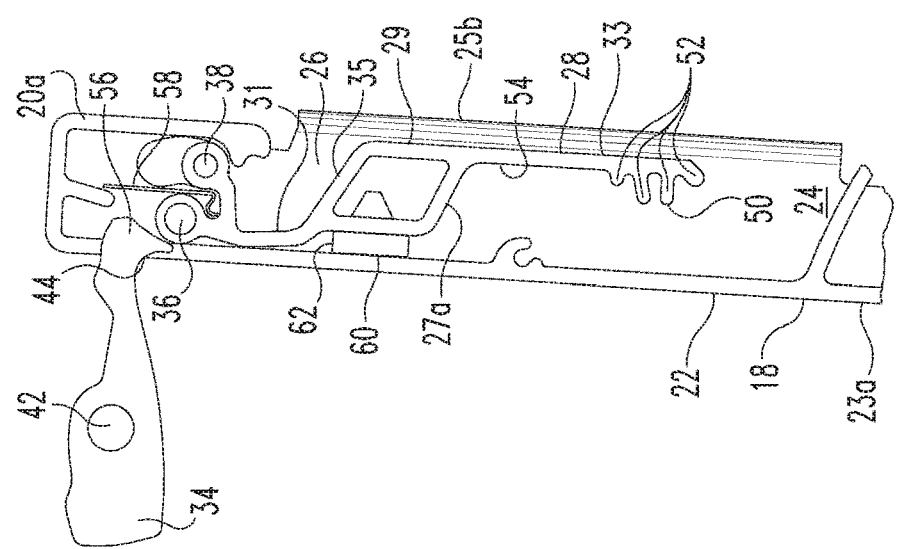
Figure 6:
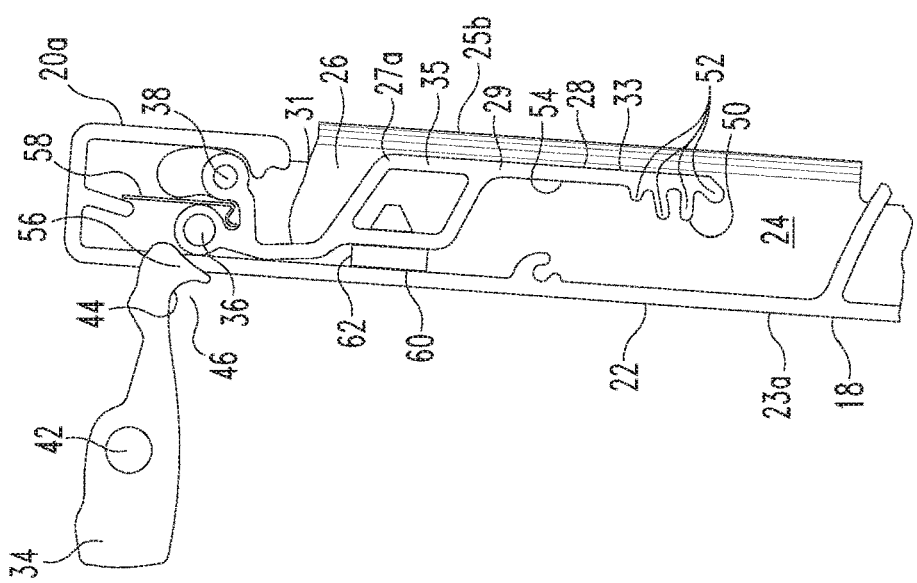
Figure 12:
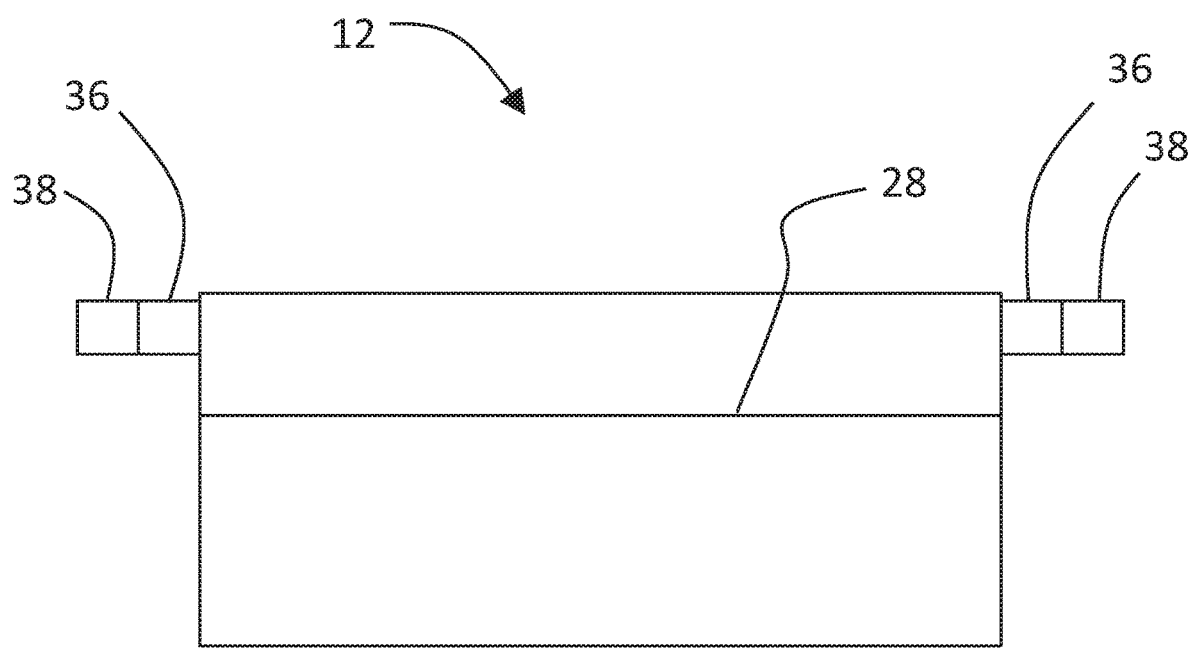
FIG. 12 illustrates multiple retention arms, multiple release mechanisms, and a handle for a gate.

As shown in at least FIGS. 6, 7, and 8, according to certain embodiments, the handle 28 is operably connected to a handle biasing member 58 that is configured to bias the handle 28 to the first position. According to certain embodiments, the biasing member 58 is a spring that is attached to the gate wall 18, and which engages the first portion of the handle 28. The handle 28 may be pivotally displaced from the first position to the second position by application of a force to the handle 28 that is sufficient to at least overcome the biasing force of the handle biasing member 58. When the force exerted on the displaced handle 28 is subsequently removed or reduced to a level below the biasing force of the handle biasing member 58, the handle biasing member 58 may provide a sufficient force against the handle 28 for the handle 28 to be pivotally displaced back to the first position.

Additionally, according to certain embodiments, the handle 28 may include a stopper 60 that at least assists in establishing the location of the handle 28 when the handle 28 is in the first position. For example, when the handle 28 is in the first position, the handle biasing member 58 may continue to exert a force against the handle 28 that attempts to bring the handle 28 into closer proximity to, or against, the rear portion 22 of the gate wall 18. Therefore, according to certain embodiments, the stopper 60 may be positioned between the rear portion 22 of the gate wall 18 and the handle 28 so as to at least assist in separating at least a portion of the handle 28 from the rear portion 22 of the gate wall 18 when the handle 28 is in the first position. The distance of separation between at least a portion of the handle 28 and the adjacent rear portion 22 of the gate wall 18 may be generally established by an axial length of a hub portion 62 of the stopper 60 that is positioned between the handle 28 and the gate wall 18. Additionally, according to certain embodiments, the stopper 60 may also provide a cushion that prevents the handle 28 from hitting against the rear portion 22 of the gate wall 18 when the force that displaced the handle 28 to the second position is removed or reduced to a level below the biasing force of the handle biasing member 58. According to the illustrated embodiment, the stopper 60 is operably connected to the midsection 35 of the handle 28, such as, for example, by a snap fit, adhesive, or mechanical fastener, among other connectors or connections.

FIGS. 6, 7, and 8 illustrate side cross sectional views of the latch mechanism 40 shown in FIG. 5 as the hinged gate 12 is being displaced towards the latched position according to an illustrated embodiment of the present invention. As shown in FIG. 6, as the hinged gate 12 approaches the latched position, the retention arm 36 moves into closer proximity to a tip region 56 of the latch 34. As demonstrated by at least FIGS. 7 and 8, in the illustrated embodiment, with the retention arm 36 contacting the tip region 56 of the latch 34, and the hinged gate 12 continuing to be moved toward the latched position, the retention arm 36 exerts a sufficient force against the tip region 56 to overcome the biasing force of the latch biasing member 45. This engagement between the retention arm 36 and the tip region 56 as the hinged gate 34 continues to be displaced toward the latched position causes the latch 34 to pivot so that the tip region 56 generally travels around and/or over the adjacent portion of the retention arm 36. For example, in the illustrated embodiment, the tip region 56 may at least initially be pivoted in a generally upward direction as the hinged gate 12 is pivotally displaced from the position shown in FIG. 7 to the position shown in FIG. 8. As the hinged gate 12 continues to be displaced toward the latch 34, the tip region 56 may continue to be displaced along the retention arm 36 until the retention arm 36 is displaced to a location in which the retention arm 36 may be received into the recess 46 of the latch 34. The latch 34 may then pivotally rotate so that at least a portion of the retention arm 36 is received into the recess 46. According to certain embodiments, such pivotal displacement of the latch 34 may be assisted or otherwise facilitated by the biasing force of the latch biasing member 45. As shown in FIG. 9, with the retention arm 36 operably positioned in the recess 46, at least a portion of the engagement portion 44 is positioned about the retention arm 36 so that the latch 34 and the retention arm 36 are lockingly engaged, thereby securing the hinged gage 12 in the latched position.

FIGS. 9, 10, and 11 illustrate side cross sectional views of the latch mechanism 40 as the handle 28 is displaced from the first position (FIG. 9) to the second position (FIG. 11), and the hinged gate 12 is released from the latched position according to an illustrated embodiment of the present invention. In the illustrated embodiment, as the handle 28 is pivoted about the retention arm 36, the release mechanism 38 is displaced to a position in which the release mechanism 38 at least engages a portion of the tip region 56 of the latch 34. Moreover, as the handle 28 is pivotally displaced toward the second position, and the release mechanism 38 continues to be displaced, the release mechanism 38 exerts a sufficient force on the tip region 56 of the latch 34 to overcome the biasing force of the latch biasing member 45, and thus pivotally displaces the latch 34. For example, as shown by FIG. 10, as the handle 28 has been displaced from the first position to an intermediary location between the first and second positions, the release mechanism 38 has been displaced to a position wherein the release mechanism 38 is engaging a portion of the tip region 56 of the latch 34. As the handle 28 continues being pivotally displaced toward the second position, and the release mechanism 38 thereby continues to be displaced, the release mechanism 38 exerts a force against the tip region 56 of the latch 34 that displaces the engagement portion 44 of the latch 34, as shown for example in FIG. 11. Such displacement of the latch 34 may cause the engagement portion 44 to be displaced to a position wherein the engagement portion 44 no longer prevents the removal of the retention arm 36 from the recess 46 of the latch 34. Thus, the retention arm 36 may be released from the latch 40, thereby allowing the hinged gate 12 to be released from the latched position. In the illustrated embodiment, with the retention arm 36 released from a locking engagement with the latch 34, the tip region 56 of the latch 34 may travel back around and/or over the retention arm 36, as shown by the changes in the relative positions of at least the tip region 56 of the latch 34 and the retention arm 36 in FIGS. 8 and 7, before again being disengaged from each other, as shown in FIG. 6.

While FIGS. 6-11 were discussed above in the context of a single latch 34, embodiments of the present invention allow the handle 28 to be used in securing and releasing a hinged gate 12 from a plurality of latches 34 as previously mentioned. For example, the handle 28 may be configured for retention arms 36 to engage latches 34 that are adjacent to opposing ends 23 a, 23 b of the gate wall 18. According to such embodiments, as the handle 28 is displaced to the second position, the release mechanisms 38 at each end of the handle 28 may engage the adjacent latch 34 so as to pivotally displace the latch 34, as previously discussed, thereby allowing the associated retention arms 36 to be generally simultaneously released from the locking engagement with the adjacent latch 34. The hinged gate 12 may then be released from the latch position.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A latch mechanism comprising:
a latch having a head which includes a tip portion and an engagement portion, the engagement portion generally defining a recess;
a handle having at least one retention arm and at least one release mechanism, the handle configured for pivotal displacement between a first position and a second position, at least a portion of the at least one retention arm adapted to be received within the recess when the handle is in the first position and to be removable from the recess at least when the handle is in the second position, the at least one release mechanism having a rounded exterior and which is separated from the at least one retention arm by an elongated neck where the elongated neck is thinner than the rounded exterior to form a head and neck configuration, the at least one release mechanism configured to engage the tip portion to pivotally displace the latch as the handle is pivotally displaced toward the second position, the elongated neck of the at least one release mechanism providing an offset of the rounded exterior from the at least one retention arm to permit the tip portion of the latch to be nested between the at least one retention arm and the rounded exterior of the release mechanism and to provide an offset for lever action of the latch relative to a hinge of the latch;
a tailgate having a front wall and a rear wall that extend between a first opposing end and a second opposing end of the tailgate, the tailgate structured to retain the handle and provide a pivot support for the pivotal displacement of the handle, the tailgate further including a protected recess between the front wall and the rear wall between which the entirety of the head of the latch resides when the at least one release mechanism engages the tip portion of the latch; and
a side cover connected to the first opposing end of the tailgate and structured to extend between the front wall and rear wall, the side cover including an orifice through which the retention arm is slidably inserted, and a guide slot through which the release mechanism is slidably guided.

2. The latch mechanism of claim 1, further including a latch biasing member configured to bias at least a portion of the engagement portion against the at least one retention arm.

3. The latch mechanism of claim 1, wherein the handle is configured to be pivotally displaced between the first position and the second position about at least a portion of the at least one retention arm.

4. The latch mechanism of claim 3, wherein the at least one retention arm is a portion of a pin that extends through a portion of the handle, and that the handle is pivotally displaced between the first position and the second position about the pin.

5. The latch mechanism of claim 1, wherein the release mechanism and the handle are part of the same monolithic structure.

6. The latch mechanism of claim 1, wherein the at least one retention arm comprises a first retention arm and a second retention arm, and wherein the at least one release mechanism comprises a first release mechanism and a second release mechanism, the first retention arm and the first release mechanism being positioned about a first end of the handle, and the second retention arm and the second release mechanism being positioned about a second end of the handle.

7. The latch mechanism of claim 6, wherein the handle further includes a biasing member, the biasing member configured to provide a biasing force to bias the handle toward the first position.

8. A latch mechanism comprising:
 a latching assembly which includes a latch and a spring used to bias the latch, the latch having a tip portion and an engagement portion, the engagement portion generally defining a recess;
 a handle having at least one retention arm and at least one release mechanism, the handle configured for pivotal displacement between a first position and a second position, at least a portion of the at least one retention arm adapted to be received within the recess when the handle is in the first position and to be removable from the recess at least when the handle is in the second position, the at least one release mechanism having a curved head which extends from a neck portion coupled between the at least one retention arm and the at least one release mechanism and in which the curved head extends beyond lateral sides of the neck, the at least one release mechanism configured to engage the tip portion to pivotally displace the latch as the handle is pivotally displaced toward the second position, the neck portion providing an offset structured to permit the tip portion to be nested between the curved head and the at least one retention arm and providing an offset to permit a lever action of the latch relative to a hinge of the latch;
 a tailgate having a top and a bottom and structured to pivot about a tailgate pivot, the tailgate also having a front wall and a rear wall that extend between opposing lateral sides, the tailgate structured to retain the handle; and
 a side cover connected to one of the opposing lateral sides of the tailgate and structured to extend between the front wall and rear wall, the side cover including a guide slot through which the release mechanism is slidably guided;
 wherein the spring of the latching assembly extends a distance less than half way between the engagement portion and the tailgate pivot.

9. The latch mechanism of claim 8, wherein the spring is configured to bias at least a portion of the engagement portion against the at least one retention arm.

10. The latch mechanism of claim 8, wherein the handle is configured to be pivotally displaced between the first position and the second position about at least a portion of the at least one retention arm.

11. The latch mechanism of claim 10, wherein the at least one retention arm is a portion of a pin that extends through a portion of the handle, and that the handle is pivotally displaced between the first position and the second position about the pin.

12. The latch mechanism of claim 8, wherein the release mechanism and the handle are part of the same monolithic structure.

13. The latch mechanism of claim 8, wherein the at least one retention arm comprises a first retention arm and a second retention arm, and wherein the at least one release mechanism comprises a first release mechanism and a second release mechanism, the first retention arm and the first release mechanism being positioned about a first end of the handle, and the second retention arm and the second release mechanism being positioned about a second end of the handle.

14. The latch mechanism of claim 8, wherein the handle further includes a biasing member, the biasing member configured to provide a biasing force to bias the handle toward the first position.

\* \* \* \* \*